March 5, 1935. A. E. R. WESTMAN 1,993,047
PROCESS FOR THE MANUFACTURE OF CERAMIC WARE
Filed Feb. 14, 1933
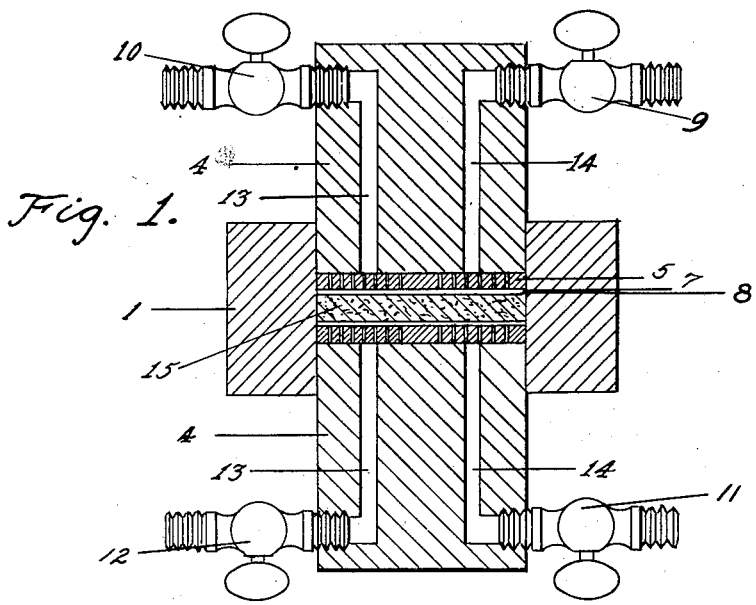
Fig. 1.
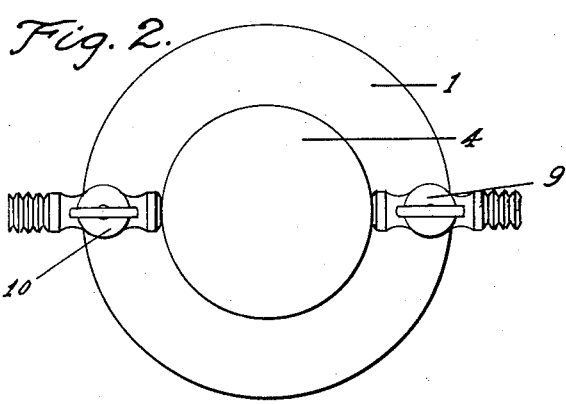
Fig. 2.
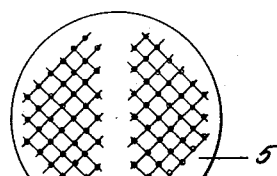
Fig. 3.
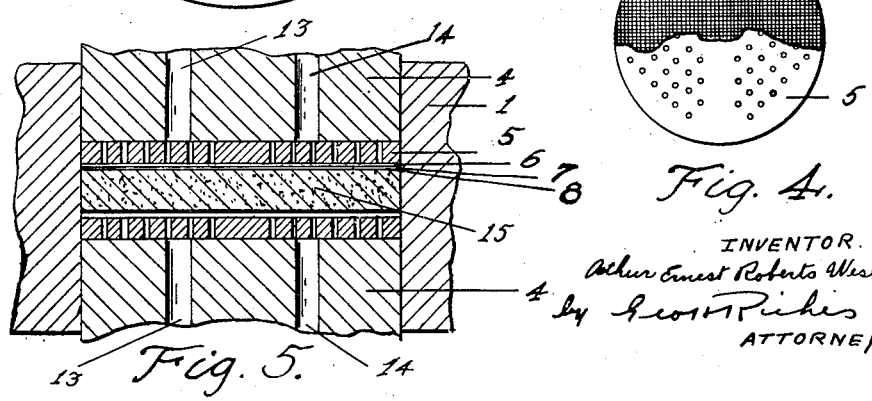
Fig. 4.
Fig. 5.
INVENTOR.
Arthur Ernest Roberts Westman
by George Pikes
ATTORNEY Patented Mar. 5, 1935

1,993,047

UNITED STATES PATENT OFFICE 1,993,047

PROCESS FOR THE MANUFACTURE OF CERAMIC WARE

Albert Ernest Roberts Westman, Toronto, Ontario, Canada, assignor to Ontario Research Foundation, Toronto, Ontario, Canada, a corporation of Ontario Application February 14, 1933, Serial No. 656,693

23 Claims. (Cl. 25—156)

This invention relates to the manufacture of ceramic ware made wholly or partly from clay or clay-like substances. Such ware is manufactured at the present time by several processes which will be described hereafter but this invention relates to a new process which is distinctly different in several respects from such processes and which has many advantages, some of which will be described later.

In general, the processes now used for manufacturing ceramic ware wholly or partly from clay involve the following steps; (1) the preparation of a mixture consisting wholly of a clay or clays and water along with non-clay ingredients such as feldspar, quartz, mullite, etc; (2) the production from the suitably prepared mixture of "green ware" of the shape and form desired; (3) the drying of the green ware to produce the dried ware; and (4) the firing of the dried ware by the application of heat so as to produce the finished or fired ware. The process now used for manufacturing ceramic ware may be divided into the following categories: (a) plastic processes; (b) casting processes; and (c) dry-press processes.

The plastic processes include a number of processes which are well-known to the art by such names as hand-molding, jiggering, softmud, extrusion, etc. The mixture of water, clay or clays, with or without non-clay ingredients such as flint, feldspar, etc., is brought to a condition known in the art as the plastic state, by methods well known to the art. The plastic mass is then molded to the desired shape by one or other of a number of procedures well known to the art, during which any reduction of the water content of the mass which may take place due to absorption by the mold is relatively small and incidental to the molding process. On drying the green ware, therefore, a very substantial shrinkage takes place. A further shrinkage occurs when the ware is fired. In one modification of the plastic process blanks are produced by extruding the plastic mass through a die and, after drying, are turned to the desired shape.

In the casting processes, the mixture of water and clay or clays, with or without non-clay ingredients such as flint, feldspar etc. is brought to a state characterized in the art by the name "slip" usually by a procedure involving the addition of chemical compounds such as soda ash, sodium silicate, etc. This slip is then introduced into a plaster mold, which by withdrawing water from the slip produces green ware of the desired shape. This green ware still contains a large percentage of water, usually more than that produced by the plastic processes described in the foregoing, and on drying suffers a pronounced shrinkage. Further shrinkage occurs on firing.

In the dry-press process, a mixture of water and clay or clays, with or without non-clay ingredients is prepared by methods well known to the art in a form having a relatively low water content. This mixture is then subjected to considerable mechanical pressure in a mold in order to produce the green ware. No appreciable decrease in the moisture content of the mixture occurs during the pressing process, and the green ware has essentially the same moisture content as the mixture from which it is molded. However, since relatively less water is used in preparing the mixture than in the plastic and casting processes, the green ware has a relatively low water content and the drying shrinkage is relatively low.

In the new and improved process which I now disclose and which may be called a permeable press process, a mixture of clay or clay-like substances with water and with or without non-clay ingredients such as flint, feldspar, etc., is brought to the condition known as the plastic state by methods well known to the art, this part of the process being exactly the same as the first step in the plastic processes described in the foregoing. The plastic mass, with or without some preforming, is then introduced into a press in which it is subjected to mechanical pressure under such conditions that the mass is molded into the form of the finished ware and at the same time it is consolidated and its moisture content substantially reduced. In this way a dense, green ware of relatively low water content is produced. The amount of consolidation and loss of water which takes place depends on the amount of pressure used and the length of time it is allowed to act. I find that by using pressures of about 200 lbs. per sq. in. with china clays, and about 700 lbs. per sq. in. with ball clays, the degree of consolidation and loss of water is such that practically no shrinkage occurs on drying; at greater pressures, not only is drying shrinkage substantially eliminated, but the firing shrinkage is materially reduced due to the greater consolidation secured.

The above results are obtained by maintaining the following conditions during the pressing operation; (1) the plastic mass is in contact with water which is free to escape during the pressing operation; (2) the escape of water from the mass is permitted but the escape of solid ingredients prevented; and (3) the water in contact with the mass is removed before the pressure is released.

I have found that condition (1) is essential at low pressures in order to eliminate surface tension forces which would prohibit the movement of water from the mass but at high pressures it is not essential as these forces are not strong enough to prevent such movement. As the surface tension of plastic masses varies for different clays and is affected by the addition of non-clay ingredients, it is not possible to definitely state these pressures as they will vary according to the type of mixture being used. By the term low pressure, I mean a pressure of an order which, without the plastic mass being in contact with water, will not have sufficient force to overcome the surface tension of such mass and by the term high pressure, I mean a pressure of a magnitude sufficient to overcome the surface tension without the presence of water. Condition (2) is always essential to the process. Condition (3) is necessary if the full advantages of the process are to be realized, particularly at high pressures, since if water is left in contact with the mass it will be drawn back into the mass as the pressure is released.

The means which I have used in my experiments to obtain the three conditions described in the previous paragraph are illustrated in the accompanying drawing of a press suitable for producing ceramic ware in the form of disks, in which:—

Fig. 1 is a vertical section of a press suitable for carrying out my process;

Fig. 2 is a plan view of the press;

Fig. 3 is a plan of one side of a disk;

Fig. 4 is a plan view of the opposite side of the same disk; and

Fig. 5 is a fragmentary sectional view of the press on a larger scale than in Fig. 1.

Like characters of reference refer to like parts throughout the specification and drawing.

The press consists essentially of a steel ring 1 in which operate two permeable pistons, each piston consisting of a steel plunger 4, a steel disk 5, a bronze screen 6, a filter paper support 7 and a filter paper 8. Each plunger has two closed-end longitudinal perforations 13, 14, connected laterally to pipe nipples carrying stop cocks 9, 10, 11 and 12. Each steel disk has two groups of 45 holes, $\frac{3}{32}$" inch in diameter at $\frac{1}{8}$" centres, separated by an unperforated strip $\frac{1}{4}$" wide along a diameter. On one face of the disk the holes in each group are interconnected by grooves $\frac{3}{32}$" wide and deep; the screen, which is cut from 40-mesh gauze, is wired to the other face. The grooved side of the disk is placed against the plunger so that each group of holes communicate with one, and only one, perforation in the plunger. The No. 123 C. S. and S. filter paper support was in contact with the screen and carried a No. 50 Whatman hard filter paper. With most clays the filter paper support was unnecessary.

The procedure which I follow in producing ceramic disks, indicated at 15, by means of the press described above is as follows: the mixture of clay or clays, non-clay ingredients and water is blunged for eight hours, allowed to dry to the plastic state on cloth-covered plaster bats, wedged thoroughly, and stored in damp jars. Disks 1¾ inches in diameter and ¼ inch thick are roughly molded as required in a plaster mold just prior to insertion in the apparatus.

The apparatus is assembled as shown in Fig. 1 with the ceramic disk 15 to be pressed between the permeable pistons. Sufficient force is applied to the pistons to bring the clay in good contact with the pistons and ring, the air escaping through the stopcocks. The air in the permeable piston and in contact with the clay is then replaced by water which is admitted through stopcocks 9 and 11 and drives the air out through stopcocks 10 and 12. The full force is then applied to the pistons with the result that water leaves the plastic mass, which is consolidated. The water in the pistons is then swept out by means of compressed air and the force on the pistons is released. The ring is forced down on the lower piston and the pressed disk removed.

In the above, I have described the manufacture of a ceramic body of simple shape according to my process, the apparatus being described for the purpose of illustrating the manner in which I carry out my process. It will be readily seen that for ceramic bodies of different shapes, it will be necessary to make changes in the form of the apparatus and the molds to conform to the shape of the body desired all of which can be accomplished without departing from the scope of my invention.

Having thus fully described my invention what I claim as new and desire to secure by Letters Patent is:

1. A process for the manufacture of ceramic ware which comprises preparing a plastic mass comprising clay and water, contacting said mass with a permeable support, and materially reducing the water content of the plastic mass by the application of sufficient mechanical pressure to expel water therefrom through and beyond said support.

2. A process for the manufacture of ceramic ware which comprises preparing a plastic mass comprising clay and water, contacting said mass with a permeable support, applying sufficient pressure to the mass to expel water therefrom through said support, and maintaining said pressure until the mass has reached a state of equilibrium.

3. A process for the manufacture of ceramic ware which comprises preparing a plastic mass comprising clay and water, materially reducing the water content of the plastic mass by the application of mechanical pressure, preventing the escape of the solid ingredients during pressing and maintaining the plastic mass in contact with water during pressing operation.

4. A process for the manufacture of ceramic ware which comprises preparing a plastic mass comprising clay and water, materially reducing the water content by the application of mechanical pressure, preventing the escape of the solid ingredients during pressing, maintaining the plastic mass in contact with water during pressing operation, withdrawing the water in contact with the plastic mass and then releasing the pressure.

5. A process for the manufacture of ceramic ware which comprises preparing a plastic mass comprising clay and water, contacting the mass with a permeable support, materially reducing the water content of the plastic mass by the application of mechanical pressure of an order greater than 200 lbs. per square inch whereby water is expelled from said mass into, through and beyond the permeable support and preventing the escape of solid ingredients during pressing.

6. A process for the manufacture of ceramic ware which comprises preparing a plastic mass comprising clay and water, contacting the mass with a permeable support materially reducing the water content of the plastic mass by the application of mechanical pressure of an order greater than 200 lbs. per square inch, maintaining the pressure until the mass has reached equilibrium and preventing the escape of solid ingredients during pressing.

7. A process for the manufacture of ceramic ware which comprises preparing a plastic mass comprising clay and water, materially reducing the water content of the plastic mass by the application of mechanical pressure of an order greater than 200 lbs. per square inch, preventing the escape of the solid ingredients during pressing and maintaining the plastic mass in contact with water during pressing operation.

8. A process for the manufacture of ceramic ware which comprises preparing a plastic mass comprising clay and water, materially reducing the water content by the application of mechanical pressure of an order greater than 200 lbs. per square inch, preventing the escape of the solid ingredients during pressing, maintaining the plastic mass in contact with water during pressing operation, withdrawing the water in contact with the plastic mass and then releasing the pressure.

9. A process for the manufacture of ceramic ware which comprises preparing a plastic mass comprising clay and water, contacting said mass with a permeable support, and applying mechanical pressure to the mass whereby it is formed to the desired shape and a substantial amount of its water content is expelled through and beyond said support.

10. A process for the manufacture of ceramic ware which comprises preparing a plastic mass comprising clay and water, contacting the mass with a permeable support, applying mechanical pressure to the mass whereby it is formed to the desired shape and a substantial amount of its water content is expelled through the support, expelling water from the support and then releasing the pressure.

11. A process for the manufacture of ceramic ware which comprises preparing a plastic mass comprising clay and water, contacting the mass with a permeable support, applying mechanical pressure to the mass whereby it is formed to the desired shape and a substantial amount of its water content is expelled through the support, and maintaining the pressure until the mass has reached equilibrium.

12. A process for the manufacture of ceramic ware which comprises preparing a plastic mass comprising clay and water, applying mechanical pressure to the mass whereby the mass is formed to the desired shape and the water content materially reduced, maintaining the mass in contact with the water during pressing operation, withdrawing the water in contact with the mass and then releasing the pressure.

13. A process for the manufacture of ceramic ware which comprises preparing a plastic mass comprising clay and water, contacting the mass with a permeable support, applying mechanical pressure to the mass of an order greater than 200 lbs. per square inch, whereby the mass is formed to the desired shape and the water content materially reduced, some of the water content of the mass being expelled therefrom into, through and beyond the permeable support, withdrawing the water in contact with the mass and then releasing the pressure.

14. A process for the manufacture of ceramic ware which comprises preparing a plastic mass comprising clay and water, contacting the mass with a permeable support, applying mechanical pressure to the mass of an order greater than 200 lbs. per square inch whereby the mass is formed to the desired shape and the water content materially reduced, maintaining the pressure until the mass has reached equilibrium, withdrawing the water in contact with the mass and then releasing the pressure.

15. A process for the manufacture of ceramic ware which comprises preparing a plastic mass comprising clay and water, applying mechanical pressure to the mass of an order greater than 200 lbs. per square inch whereby the mass is formed to the desired shape and the water content materially reduced, maintaining the mass in contact with water during pressing operation, withdrawing the water in contact with the mass and releasing the pressure.

16. A process for the manufacture of ceramic ware which comprises preparing a plastic mass comprising clay and water, materially reducing the water content by the application of mechanical pressure to the mass of an order insufficient to overcome the surface tension forces of the mass, eliminating the surface tension forces of the mass by maintaining the mass in contact with water during pressing operation and preventing the escape of the solid ingredients during pressing.

17. A process for the manufacture of ceramic ware which comprises preparing a plastic mass comprising clay and water, materially reducing the water content by the application of mechanical pressure to the mass of an order insufficient to overcome the surface tension forces of the mass, eliminating the surface tension forces of the mass by maintaining the mass in contact with water during pressing operation, preventing the escape of the solid ingredients during pressing, withdrawing the water in contact with the plastic mass and then releasing the pressure.

18. A process for the manufacture of ceramic ware which comprises preparing a plastic mass comprising clay and water, materially reducing the water content by the application of mechanical pressure to the mass of an order high enough to overcome the surface tension forces of the mass, and preventing the escape of the solid ingredients during pressing.

19. A process for the manufacture of ceramic ware which comprises preparing a plastic mass comprising clay and water, materially reducing the water content of the mass by the application of mechanical pressure thereto of an order high enough to overcome the surface tension forces of the mass while the latter is in contact with a permeable support which permits the passage of water but prevents the escape of the solid ingredients during pressing, withdrawing the water in contact with the plastic mass and then releasing the pressure.

20. A process for the manufacture of ceramic ware which comprises preparing a plastic mass comprising clay and water, forming the mass to the desired shape and materially reducing the water content by the application of mechanical pressure to the mass of an order insufficient to overcome the surface tension forces, eliminating the surface tension forces by maintaining the mass in contact with water during pressing operation and preventing the escape of solid ingredients during pressing operation.

21. A process for the manufacture of ceramic ware which comprises preparing a plastic mass comprising clay and water, forming the mass to the desired shape and materially reducing the water content by the application of mechanical pressure to the mass of an order insufficient to overcome the surface tension forces, eliminating the surface tension forces by maintaining the mass in contact with water during pressing operation, preventing the escape of solid ingredients during pressing operation, withdrawing the water in contact with the plastic mass and then releasing the pressure.

22. A process for the manufacture of ceramic ware which comprises preparing a plastic mass comprising clay and water, forming the mass to the desired shape and materially reducing the water content by the application of mechanical pressure to the mass of an order high enough to overcome the surface tension forces of the mass while the latter is in contact with a permeable support which permits the passage of water but prevents the escape of the solid ingredients during pressing operation.

23. A process for the manufacture of ceramic ware which comprises preparing a plastic mass comprising clay and water, forming the mass to the desired shape and materially reducing the water content by the application of mechanical pressure to the mass of an order high enough to overcome the surface tension forces of the mass while the latter is in contact with a permeable support which permits the passage of water but prevents escape of the solid ingredients during pressing operation, withdrawing the water in contact with the plastic mass and then releasing the pressure.

ALBERT ERNEST ROBERTS WESTMAN.